United States Patent [19]

Grüb

[11] 4,321,475
[45] Mar. 23, 1982

[54] HYDROELECTRIC POWER GENERATING ARRANGEMENT

[76] Inventor: Rainer Grüb, Richard Wagner Str. 55, D-7800 Freiburg, Fed. Rep. of Germany

[21] Appl. No.: 81,154

[22] Filed: Oct. 2, 1979

[30] Foreign Application Priority Data

Oct. 6, 1978 [DE] Fed. Rep. of Germany ....... 2843675
Jul. 7, 1979 [DE] Fed. Rep. of Germany ....... 2927498

[51] Int. Cl.³ .................... F15B 11/06; F03D 9/02
[52] U.S. Cl. ................................. 290/52; 60/398; 60/413
[58] Field of Search ............... 290/52, 55, 44; 60/398, 60/413, 418

[56] References Cited

U.S. PATENT DOCUMENTS 2,962,599 11/1960 Pirkey .................................. 290/43
4,166,222 8/1979 Hanley ................................. 290/55
4,211,077 7/1980 Cassidy ............................... 60/398

OTHER PUBLICATIONS

Eldridge, F. R., "Wind Machines", NSF Report 1975, p. 35.

Primary Examiner—J. D. Miller
Assistant Examiner—D. L. Rebsch
Attorney, Agent, or Firm—Kontler & Grimes

[57] ABSTRACT

An electric power generating arrangement includes a container which is situated below the upper level of a body of water and has an inlet and an outlet. Water from the body of water is admitted into the receiving space bounded by the container through the inlet and drives a turbine, while water is being pumped out of the receiving space through the outlet, preferably by energy derived from the force of wind or by excess electric energy derived from an electric distribution network during off-peak periods. The container can be constituted by walls which completely delimit the receiving space, or may be constituted by a wall which separates a bay or the like from the remainder of a natural body of water. When the receiving space is enclosed from all sides, a venting conduit is provided which admits replenishment air into the receiving space and lets air escape from the receiving space in dependency on the level reached by the quantity of water contained in the container.

27 Claims, 3 Drawing Figures

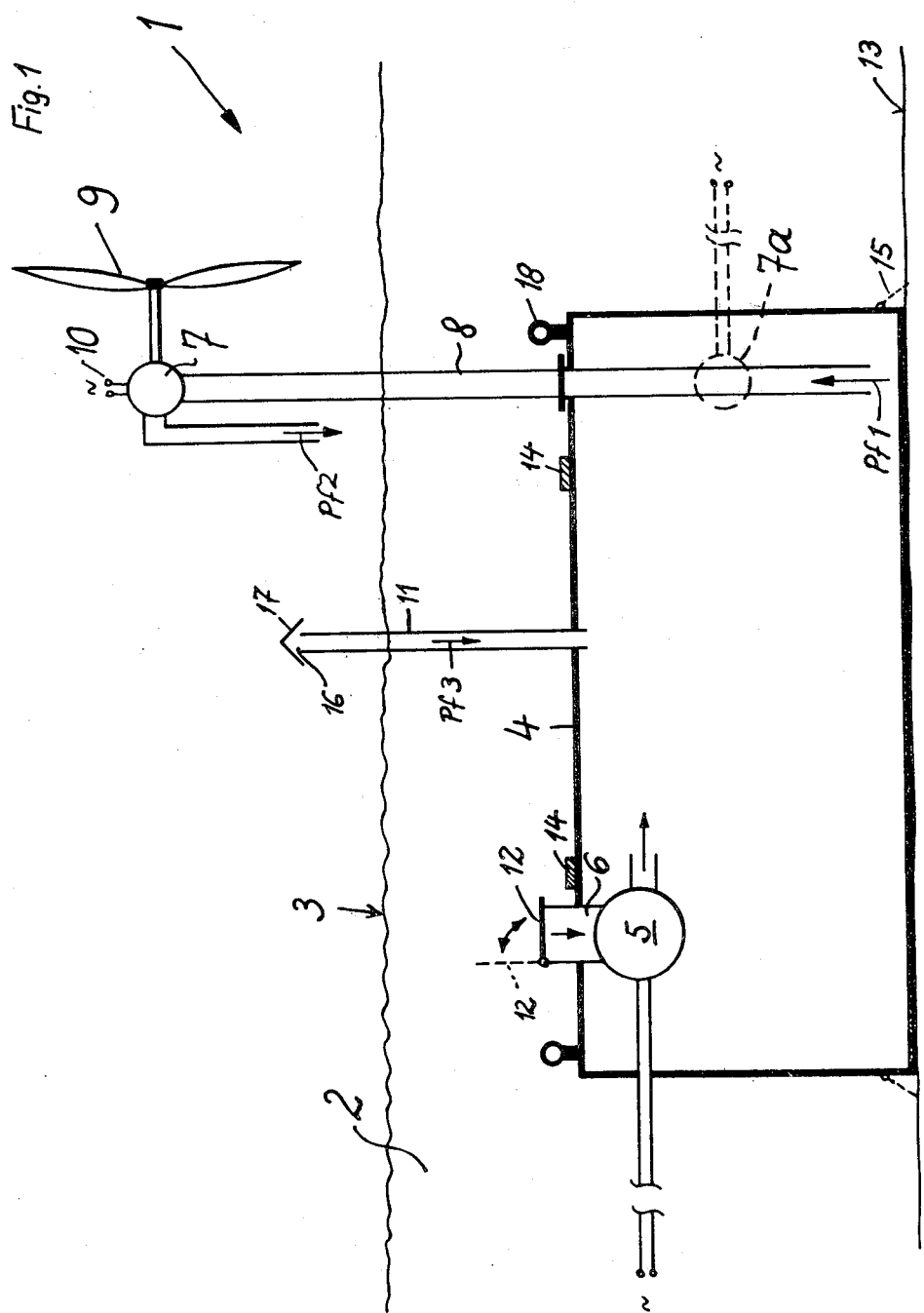

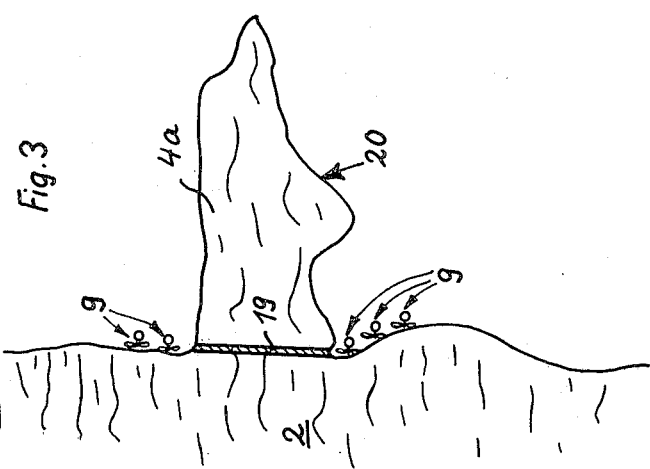
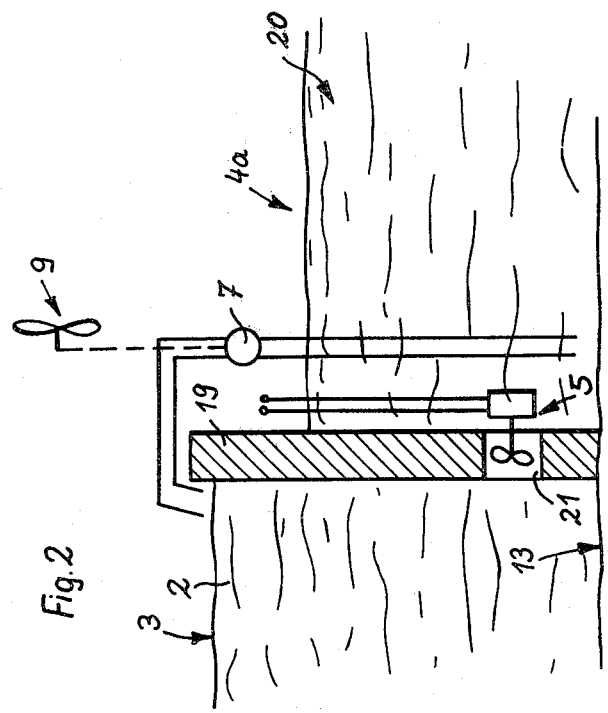

HYDROELECTRIC POWER GENERATING ARRANGEMENT

BACKGROUND OF THE INVENTION

The present invention relates to a hydroelectric power generating arrangement in general, and more particularly to an arrangement of this type which is capable of generating electric power during periods of peak demand, and of storing energy during the off-peak periods.

Arrangements of this latter type are already known and widely used. They are usually constructed as pumped storage stations which utilize the difference in elevation of two bodies of water in order to produce electric current during the day or during peak periods, and to pump water from the lower body into the higher body during the night or during the off-peak periods by means of electric current which is then available in abundance. By using hydroelectric power stations of this type, it is possible to satisfy the peak demands in that the station delivers additional electric current into the electric power distribution network and, on the other hand, to equalize the demands on the other stations of conventional construction, such as steam-powered generators, which supply electric current into the same electric power distribution network by consuming the excess production of these other stations during off-peak or low-demand periods so that these other stations need not be put out of operation during such low-demand periods. These prior-art arrangements are advantageous in many respects; however, they are also disadvantageous in other respects, particularly in that they require a high amount of investment in building and operating two or more water reservoirs located at different elevations.

OBJECTS AND SUMMARY OF THE INVENTION

It is a general object of the present invention to avoid the disadvantages of the prior art.

More particularly, it is an object of the invention to provide a hydroelectric power generating arrangement which is not possessed of the disadvantages of the prior-art arrangements of this type.

Still another object of the invention is to provide an arrangement of the type here under discussion which is capable of utilizing the hydrostatic pressure within a body of water for the generation of electric current.

A concomitant object of the invention is to so construct the arrangement of the present invention as to be usable in any stationary body of water having a sufficient size.

Yet another object of the present invention is to develop a new and improved hydroelectric power generating arrangement which is simple in construction, relatively inexpensive to provide, easy to operate, and reliable nevertheless.

In pursuance of these objects and others which will become apparent hereafter, one feature of the present invention resides in an electric power generating arrangement which, briefly stated, comprises means for separating from a body of water a receiving space which is at least partially situated below the upper level of the body of water; means for communicating the body of water with the receiving space; fluid-displacement means located in the communicating means and operative for generating electric power when water flows through the communicating means into the receiving space due to hydrostatic pressure differential between the body of water and the receiving space, and for pumping water out of the receiving space through the communicating means; and means for driving the fluid-displacement means during the pumping operation thereof. It is particularly advantageous when the communicating means includes at least one inlet and one outlet, and when the fluid-displacement means includes a turbine located in the inlet, and at least one pump located in the outlet. The driving means may include an electric motor connected to the pump, and a source of off-peak electric power electrically connected to the electric motor. On the other hand, it is also advantageous when the driving means includes at least one wind wheel.

When the electric power generating arrangement is constructed to the above-discussed manner, and when water is permitted to flow from the body of water into the receiving space which is at least partially located below the upper level of the body of water and which is totally or partially empty at that time, the water flowing through the inlet drives the turbine which is situated in the inlet so that the turbine generates electric current. Depending on the depth of the body of water at which the receiving space is located, and on the volume of the receiving space, there can be produced considerable amounts of electric current. In view of the fact that a relatively strong wind is often encountered at the region of such bodies of water, it is possible to utilize the kinetic energy of the wind to empty the receiving space. This can be done after the termination of the power-generating operation of the turbine, that is, when the receiving space is full, or, better yet, during the power-generating operation, that is, while the receiving space is being filled. In this manner, it is possible to store, in an advantageous and simple manner, the energy of the wind, in that the corresponding receiving space can be emptied while the wind is blowing and can be filled at any time in order to produce electric current. When the energy derived from wind is insufficient, such as it would be during a period of lull or after a protracted period of low-speed winds, it is possible to use excess power from the electric power distribution network (such as night current) for emptying the receiving space, in a similar manner as that used in the conventional pump storage stations.

The wind wheel can be directly connected to the pump for driving the same, but the connection could also be mediate, for instance, in that the wind wheel drives an electric power generator producing electric current that energizes the pump. A particular advantage of the latter solution is that the wind wheel may be located at a considerable distance from the pump, such as at the shore of the body of water, and even at a different elevation than the pump. This, in turn, brings about two additional advantages. On the one hand, large-size and thus large-capacity wind wheels can be used when they are mounted on the shore of the body of water and, because of the large amount of space available on the shore for the mounting of the wind wheels, a substantial number of such wind wheels can be mounted on the shore to supply electric energy to the pump or pumps which are capable of emptying the respective receiving space. Thus, the pump or pumps may have a large pumping capacity so that the receiving space may be given a correspondingly large volume. On the other hand, it is very simple to convert the pump from the use of the power output of the wind wheel to the use of excess electric power derived from the distribution network during the periods of lull and off-peak demands and vice versa. This, in turn, means that the arrangement can be so constructed as to have a substantial energy-storing capacity and, consequently, correspondingly large electric current generating capacity during the periods of peak demand.

A particularly advantageous construction of the arrangement of the present invention is obtained when the separating means is constructed as a wall, dam, or the like which separates a portion of a, for instance natural, body of water (such as a lake, sea or the like) from the remainder of the body of water. The wall extends from the bottom of the formation which confines the body of water at least to the top level of the body of water which is contained in the aforementioned remainder so as to effectively separate the receiving space delimited by the wall from the body of water. It is especially advantageous when the wall extends across an inlet of a bay or the like of the natural body of water. Under these circumstances, a potential energy difference exists between the body of water and the receiving space so long as the upper level of water in the receiving space is below that of the body of water separated from the receiving space by the wall.

The novel features which are considered as characteristic of the invention are set forth in particular in the appended claims. The improved hydroelectric power arrangement, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic partially sectioned side elevational view of the arrangement of the present invention including a container which is fully situated under the upper level of a body of water;

FIG. 2 is a vertical section of a modification of the arrangement of FIG. 1 wherein a separating wall separates the body of water from an upwardly opened receiving space; and FIG. 3 is a top plan view of the arrangement of FIG. 2.

DESCRIPTION OF THE PREFERRED EMBODIMENTS

Referring now to the drawing in detail, and first to FIG. 1 thereof, it may seen that the reference numeral 1 has been used to identify the hydroelectric power generating arrangement of the present invention in its entirety. The arrangement 1 serves for the generation of electric current on the basis of hydrostatic pressure existing in a body of water 2. The body of water 2 has an upper level 3, and a container 4 is situated in the body of water 2, being fully located below the upper level 3. The container 4 has an inlet 6 in which there is arranged a turbine 5, and an outlet 8 in which there is arranged a pump 7. The arrangement further includes a wind wheel 9 which drives the pump 7. In the arrangement illustrated in FIG. 1, the pump 7 is directly driven by the wind wheel 9 so that relatively low power losses occur. However, FIG. 1 also illustrates an electrical connection 10. Excess electric power (such as night current) can be supplied via the electric connection 10 to an electric motor of a conventional construction which then drives the pump 7. In this instance, the pump 7 is constructed as a suction pump which is capable of driving water out of the immersed container 4. As shown, the wind wheel 9 is mounted directly on the pump 7. However, the wind wheel 9 could also be mounted at the shore of the body of water 2 (similarly to the situation illustrated in FIG. 3) or on the bottom 13 of the body of water 2. Then, the pump 7 could be driven mediately or indirectly such as by providing a generator at the wind wheel 9, an electromotor at the pump 7, and electrical leads connecting the generator with the electric motor. Under these circumstances, more than one wind wheel 9 could be used for supplying the pump 7 with electric energy. A particular advantage of this expedient is that the power of the wind can be more effectively utilized when a plurality of the wind wheels 9 is used. Furthermore, it is quite easy to effect the switch-over from wind power to excess electric power derived from the distribution network inasmuch as the same electric motor can be used for driving the pump 7 in both instances.

A possible modification, which is also contemplated by the present invention but which has not been illustrated in the drawing, is to arrange a screw-type pump of a conventional construction in a conduit which constitutes the outlet 8 of the container 4 and which extends from the interior of this container 4 to above the upper level 3 of the body of water 2. The inlet end of this screw-type pump is then located as far below the upper level 3 of the body of water 2 as possible or practicable, preferably in the container 4. When the pump has this construction, it is possible to achieve a certain elevation head in the water being pumped so that the container 4 can be located at a substantial depth underneath the upper level 3 of the body of water 2. A further possibility is illustrated in FIG. 1 in broken lines. In this instance, a pressure pump 7a is connected to the outlet conduit 8, preferably within the container 4. A pump of this type also renders it possible to achieve a certain elevation head in the water being pumped. Under these circumstances, the wind wheel 9 or each of a plurality of such wind wheels 9 is provided with a generator which generates electric current and which is connected to the pump 7a by the indicated electric leads. The loss in efficiency which results from the conversion of mechanical energy into electrical energy and then again into mechanical energy is a certain disadvantage of this mediate connection of the wind wheel 9 to the pump 7a, but this disadvantage is outweighed by the fact that the container 4 can be located at a greater depth below the upper level 3 of the body of water 2, which renders it possible to operate at higher hydrostatic pressures so that the amount of current generated by the turbine 5 is correspondingly increased.

It can also be seen in FIG. 1 that the inlet 6 of the container 4 can be closed upstream of the turbine 5 by a closure 12, and that the container 4 is equipped with an air venting conduit 11 which communicates the receiving space defined by the container 4 with the ambient atmosphere above the upper level 3 of the body of water 2. As illustrated, the closure 12 provided at the inlet 6 of the container 4 upstream of the turbine 5 is constructed as a pivotable flap which, in the position illustrated in a solid line, assumes its closing position. At this time, water is withdrawn from the receiving space of the container 4 through the outlet 8 by the action of the pump 7 and/or the pump 7a, as indicated by the arrows Pf1 and Pf2. At the same time, replacement air flows into the receiving space of the container 4 through the venting conduit 11 in the direction of the arrow Pf3. When electric current is to be generated by the turbine 5, the closure 12 is moved into its position indicated in a broken line. During the electric current generating period, the operation of the pump 7 and/or 7a may be discontinued. However, it is also possible to perform the pumping operation at the same time as water is admitted into the container 4 through the inlet 6, so that the power of the wind is utilized even while current is being generated by the turbine 5. Under these circumstances, the venting conduit 11 may be open or even closed in a conventional manner which has not been illustrated.

It is further illustrated in FIG. 1 that the container 4 is anchored by at least one anchoring arrangement at the desired depth beneath the upper level 3 of the body of water 2, preferably at the bottom 13 of the body of water 2. Thus, for instance, the container 4 can be anchored by straps 14 which embrace the same and/or by chains 15 or the like which are fastened to the container 4 and anchored at the bottom 13. However, another possibility contemplated by the present invention is a container which is built or buried at the bottom 13 of the body of water 2.

It is advantageous for achieving the longest possible time of operation of the turbine 5 when the lateral or horizontal dimensions of the container 4 are respective multiples of the height of the container 4 inasmuch as the container 4 can accommodate a substantial amount of water while the suction or pressure head of the pump 7 or 7a is not considerably changed.

A further possibility contemplated by the present invention, which is especially advantageous when the present invention is used in a body of water 2 which has substantial depth, is to provide a plurality of containers 4 which are connected with one another by means of connecting openings or conduits which, if need be, can be closed. Such containers can be arranged next to one another and/or above each other.

As can be further ascertained from FIG. 1, the air venting conduit 11 has an inlet portion 16 which, as illustrated, is covered by a hood 17.

The anchoring arrangements 14 and/or 15 which anchor the container 4 below the upper surface 3 of the body of water 2 can be releasable, and the container 4 can be equipped with engaging arrangements, such as eyelets 18 or the like which can be engaged by a hook or the like of a crane or a similar lifting arrangement. By resorting to this expedient, it is possible to periodically lift the container 4 from its original position at least partially below the upper level 3 of the body of water 2 so that the container 4 can be inspected or repaired either at the upper level 3 of the body of water 2 or on the shore of the body of water 2.

It is to be noted that the expression "below the upper level 3 of the body of water 2", which was used above in connection with the container 4 the contents of which are to be pumped out, is intended to embrace an arrangement in which the upper level of the quantity of water received in the receiving space of the container 4 reaches the same elevation as the upper level 3 of the body of water 2 outside the container 4 when the full capacity of the receiving space of the container 4 is reached. Such a possibility will now be explained in connection with FIGS. 2 and 3.

As illustrated in these Figures, the container 4a is delimited by a wall or dam 19 or the like which extends from the bottom 13 of the body of water 2 at least to the upper level 3 of the body of water 2. The dam 19 separates a part 20 of a formation which confines the body of water 2 from the remainder of the formation, so that the upper level of the adjoining part 20 can be at an elevation lower than that of the upper level 3 of the main body of water 2, as shown in FIG. 2. It is particularly advantageous in this connection when the dam 19 separates a bay 20 of a natural body of water, such as a lake, sea or the like, from the main portion of the body of water 2, in the manner illustrated in FIG. 3. Thus, the wall or dam 19 delimits an upwardly open container 4a. In this manner, it is possible to construct corresponding containers 4a at a relatively low expense at the shore of a natural body of water, especially when the coastline is rugged.

It can be seen in FIG. 2 that the turbine 5 or, when the containter 4a has a substantial capacity and/or the wall or dam has a sufficient length, even a plurality of the turbines 5, is arranged in or at the dam 19, especially in an opening 21 in the wall 19, as close as possible to the bottom 13 of the body of water 2. The turbine or turbines 5 generate electric current in the manner discussed previously. More particularly, when water flows from the main body of water 2 into the bay or a similar container 4a, the turbine 5 generates electric current. Thus, at least a part of the energy which has been stored in the container 4a during the pumping out of its contents by the pump 7 which is driven by the wind wheel 9 that utilizes the energy of the wind, can be recouped. In this example of the embodiment of the present invention, it is also possible that the wind wheel or wind wheels 9 are mounted, for instance, on the dam 19 and/or on the shore of the bay 20.

In this manner, there is provided a possibility of utilizing the force of the wind, which is encountered especially in the immediate vicinity of natural bodies of water, not only during the period that the wind blows, but also at other times. This is rendered possible due to the fact that, as a result of the pumping of the water out of the container 4 or 4a, the energy of the wind is stored via the mediation of the hydrostatic pressure of the body of water 2. Herein, the arrangement 1 in its entirety can be constructed in a relatively simple manner so that, taken together, there is provided an additional possibility of generation of electric energy which does not result in the emission of any deleterious substances, such as combustion gases or inordinate amounts of heat, either into the atmosphere or into the body of water.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. An electric power generating arrangement, comprising means bounding an enclosed receiving space which is separated from and at least partially situated below the upper level of a body of water, said means including a container which is at least partially immersed in the body of water; means for communicationg said receiving space with the body of water; water-displacement means located in said communicating means and operative to generate electric power when water flows through said communicating means into said receiving space due to a hydrostatic pressure differential between the body of water and said receiving space, and to pump water out of said receiving space through said communicating means; and wind-driven means for driving said water-displacement means during the pumping operation thereof.

2. The arrangement as defined in claim 1, wherein said communicating means includes at least one inlet and one outlet; and wherein said water-displacement means includes a turbine located in said inlet, and at least one pump located in said outlet.

3. The arrangement as defined in claim 2, wherein said driving means includes an electric motor connected to said pump, and a source of off-peak electric power electrically connected to said electric motor.

4. The arrangement as defined in claim 2, wherein said driving means includes at least one wind wheel.

5. An electric power generating arrangement, comprising means including at least one container bounding an enclosed receiving space which is separated from and at least partially situated below the upper level of a body of water; means for communicating said receiving space with the body of water, said communicating means including at least one inlet and one outlet; fluid-displacement means located in said communicating means and operative to generate electric power when water flows through said communicating means into said receiving space due to a hydrostatic pressure differential between the body of water and said receiving space, and to pump water out of said receiving space through said communicating means, said fluid-displacement means including a turbine located in said inlet and at least one pump located in said outlet; and means for driving said fluid-displacement means during the pumping operation thereof, said driving means including at least one wind wheel and means for directly connecting said wind wheel to said pump.

6. The arrangement as defined in claim 4, wherein said driving means further includes means for mediately connecting said wind wheel to said pump.

7. The arrangement as defined in claim 6, wherein said mediately connecting means includes an electric power generator driven by said wind wheel and an electric motor electrically connected to said generator and driving said pump.

8. An electric power generating arrangement, comprising means including at least one container bounding an enclosed receiving space which is separated from and at least partially situated below the upper level of a body of water; means for communicating said receiving space with the body of water, said communicating means including at least one inlet and one outlet; fluid-displacement means located in said communicating means and operative to generate electric power when water flows through said communicating means into said receiving space due to a hydrostatic pressure differential between the body of water and said receiving space, and to pump water out of said receiving space through said communicating means, said fluid-displacement means including a turbine located in said inlet and a suction pump located in said outlet; and means for driving said fluid-displacement means during the pumping operation thereof.

9. An electric power generating arrangement, comprising means including at least one container bounding an enclosed receiving space which is separated from and at least partially situated below the upper level of a body of water; means for communicating said receiving space with the body of water, said communicating means including at least one inlet and one outlet, and said outlet being constituted by an outlet tube extending from said receiving space to above the upper level of the body of water; fluid-displacement means located in said communicating means and operative to generate electric power when water flows through said communicating means into said receiving space due to a hydrostatic pressure differential between the body of water and said receiving space, and to pump water out of said receiving space through said communicating means, said fluid-displacement means including a turbine located in said inlet and at least one pump located in said outlet, and said pump being constructed as a screw-type pump accommodated in said outlet tube and having an intake located below the upper level of the body of water; and means for driving said fluid-displacement means during the pumping operation thereof.

10. The arrangement as defined in claim 9, wherein said intake is located within said receiving space.

11. The arrangement as defined in claim 2, wherein said pump is constructed as a pressure pump located below the upper level of the body of water.

12. An electric power generating arrangement, comprising means including at least one container bounding an enclosed receiving space which is separated from and at least partially situated below the upper level of a body of water; means for communicating said receiving space with the body of water, said communicating means including at least one inlet and one outlet; fluid-displacement means located in said communicating means and operative to generate electric power when water flows through said communicating means into said receiving space due to a hydrostatic pressure differential between the body of water and said receiving space, and to pump water out of said receiving space through said communicating means, said fluid-displacement means including a turbine located in said inlet and at least one pump located in said outlet, and said pump being constructed as a pressure pump located below the upper level of the body of water and in said receiving space; and means for driving said fluid-displacement means during the pumping operation thereof.

13. An electric power generating arrangement, comprising means including at least one container bounding an enclosed receiving space which is separated from and at least partially situated below the upper level of a body of water; means for communicating said receiving space with the body of water, said communicating means including at least one inlet and one outlet; fluid-displacement means located in said communicating means and operative to generate electric power when water flows through said communicating means into said receiving space due to a hydrostatic pressure differential between the body of water and said receiving space, and to pump water out of said receiving space through said communicating means, said fluid-displacement means including a turbine located in said inlet and at least one pump located in said outlet, and said pump being constructed as a pressure pump located below the upper level of the body of water, said fluid-displacement means further including an additional pump which is constructed as a suction pump; and means for driving said fluid-displacement means during the pumping operation thereof.

14. The arrangement as defined in claim 13, wherein said driving means includes means for driving said pump and said additional pump in conjunction with one another.

15. The arrangement as defined in claim 13, wherein said driving means includes means for selectively driving one of said pumps while the other pump is stopped.

16. An electric power generating arrangement, comprising means including at least one container bounding an enclosed receiving space which is separated from and at least partially situated below the upper level of a body of water; means for communicating said receiving space with the body of water, said communicating means including at least one inlet and one outlet; means for closing said inlet; fluid-displacement means located in said communicating means and operative to generate electric power when water flows through said communicating means into said receiving space due to a hydrostatic pressure differential between the body of water and said receiving space, and to pump water out of said receiving space through said communicating means, said fluid-displacement means including a turbine located in said inlet and at least one pump located in said outlet; and means for driving said fluid-displacement means during the pumping operation thereof.

17. An electric power generating arrangement, comprising means including at least one container bounding an enclosed receiving space which is separated from and at least partially situated below the upper level of a body of water; means for communicating said receiving space with the body of water; fluid-displacement means located in said communicating means and operative to generate electric power when water flows through said communicating means into said receiving space due to a hydrostatic pressure differential between the body of water and said receiving space, and to pump water out of said receiving space through said communicating means; means for driving said fluid-displacement means during the pumping operation thereof; and venting means communicating said receiving space with ambient atmosphere above the upper level of the body of water.

18. The arrangement as defined in claim 17, wherein said container is fully located below the upper level of the body of water; and wherein said venting means includes at least one venting tube having an end portion rising to a level above the upper level of the body of water.

19. The arrangement as defined in claim 18, and further comprising a cover mounted on said end portion and covering the same.

20. The arrangement as defined in claim 19, wherein said cover is substantially hood shaped.

21. An electric power generating arrangement, comprising means including at least one container bounding an enclosed receiving space which is separated from and at least partially situated below the upper level of a body of water; means for so anchoring said container at a predetermined location of the body of water as to extend to a predetermined depth below the upper level of the body of water; means for communicating said receiving space with the body of water, said communicating means including at least one inlet and one outlet; fluid-displacement means located in said communicating means and operative to generate electric power when water flows through said communicating means into said receiving space due to a hydrostatic pressure differential between the body of water and said receiving space, and to pump water out of said receiving space through said communicating means, said fluid-displacement means including a turbine located in said inlet and at least one pump located in said outlet; and means for driving said fluid-displacement means during the pumping operation thereof.

22. The arrangement as defined in claim 21, wherein said anchoring means anchors said container substantially at the bottom of the body of water.

23. The arrangement as defined in claim 21, wherein said anchoring means is so constructed as to be detachable from said container; and further comprising engaging means on said container for use in lifting the latter.

24. The arrangement as defined in claim 23, wherein said engaging means includes eyelets affixed to said container.

25. An electric power generating arrangement, comprising means including at least one container bounding an enclosed receiving space which is separated from and at least partially situated below the upper level of a body of water, said container having horizontal dimensions considerably exceeding its vertical dimensions; means for communicating said receiving space with the body of water, said communicating means including at least one inlet and one outlet; fluid-displacement means located in said communicating means and operative to generate electric power when water flows through said communicating means into said receiving space due to a hydrostatic pressure differential between the body of water and said receiving space, and to pump water out of said receiving space through said communicating means, said fluid-displacement means including a turbine located in said inlet and at least one pump located in said outlet; and means for driving said fluid-displacement means during the pumping operation thereof.

26. An electric power generating arrangement, comprising means including a plurality of individual containers bounding an enclosed receiving space which is separated from and at least partially situated below the upper level of a body of water, said means further including means communicatively interconnecting said containers; means for communicating said receiving space with the body of water, said communicating means including at least one inlet and one outlet; fluid-displacement means located in said communicating means and operative to generate electric power when water flows through said communicating means into said receiving space due to a hydrostatic pressure differential between the body of water and said receiving space, said fluid-displacement including a turbine located in said inlet and at least one pump located in said outlet; and means for driving said fluid-displacement means during the pumping operation thereof.

27. The arrangement as defined in claim 26, and further comprising means for selectively closing said interconnecting means.

* * * * *